United States Patent [19]

Froehlich

[11] Patent Number: 4,898,505
[45] Date of Patent: Feb. 6, 1990

[54] EXPANSION DOWEL ASSEMBLY WITH AN EXPANSION CONE DISPLACEABLE INTO AN EXPANSION SLEEVE

[75] Inventor: Peter Froehlich, Neuried, Fed. Rep. of Germany

[73] Assignee: Hilti Aktiengesellschaft, Liechtenstein

[21] Appl. No.: 273,409

[22] Filed: Nov. 18, 1988

[30] Foreign Application Priority Data

Nov. 23, 1987 [DE] Fed. Rep. of Germany ....... 3739608

[51] Int. Cl.$^4$ .............................................. F16B 13/06
[52] U.S. Cl. ........................................ 411/55; 411/57; 411/72
[58] Field of Search ..................... 411/44, 49, 50, 52, 411/53, 55, 57, 60, 69, 70, 71, 72

[56] References Cited

U.S. PATENT DOCUMENTS

| | | | |
|---|---|---|---|
| 612,316 | 10/1898 | Downes | 411/55 |
| 1,035,277 | 8/1912 | Veres | 411/53 |
| 2,661,649 | 12/1953 | Skinner | 411/53 |
| 3,091,991 | 6/1963 | Baker | 411/54 |
| 4,094,223 | 6/1978 | Fischer | 411/44 |
| 4,137,816 | 2/1979 | Gärtner | 411/2 |
| 4,403,894 | 9/1983 | Clark | 411/44 X |

FOREIGN PATENT DOCUMENTS

| | | | |
|---|---|---|---|
| 75641 | 5/1953 | Denmark | 411/71 |
| 0008085 | 2/1980 | European Pat. Off. | 411/55 |
| 3535618 | 4/1987 | Fed. Rep. of Germany | 411/55 |
| 2145493 | 3/1985 | United Kingdom | 411/34 |

Primary Examiner—Gary L. Smith
Assistant Examiner—Douglas E. Ringel
Attorney, Agent, or Firm—Toren, McGeady & Associates

[57] ABSTRACT

An expansion dowel assembly includes an axially extending anchor bolt and an expansion sleeve laterally enclosing the bolt. At its leading end, the anchor bolt has an expansion cone displaceable opposite to the insertion direction of the dowel assembly relative to a conically shaped expansion region at the leading end of the sleeve. Initially, the cone angle of the expansion cone is larger than the cone angle of the expansion section of the sleeve. A circumferentially extending annular bead is located on the outer circumferential periphery of the expansion region. The expansion region is slotted in the axial direction and its wall thickness decreases in the circumferential direction toward the slots. At the outset of the sleeve expansion, it is greatly widened and the annular bead is pressed into the surface of the borehole in which the dowel assembly is inserted. As a result, a positive locking engagement is provided between the expansion sleeve and the receiving material in which the borehole is formed, so that the dowel assembly can be utilized in a cracked-prone tensile zone of the receiving material.

5 Claims, 1 Drawing Sheet

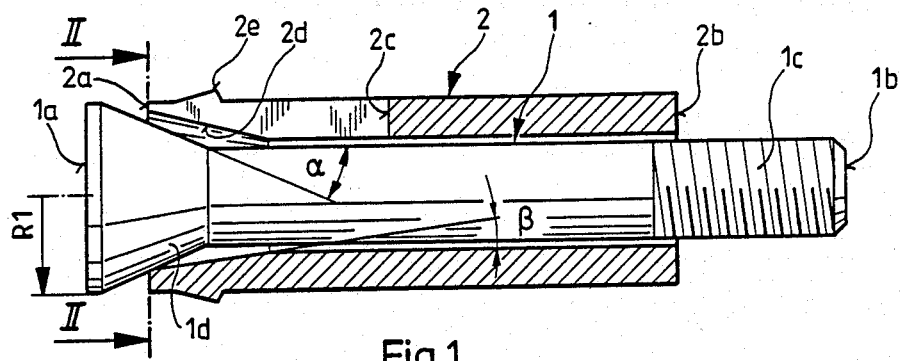
Fig.1
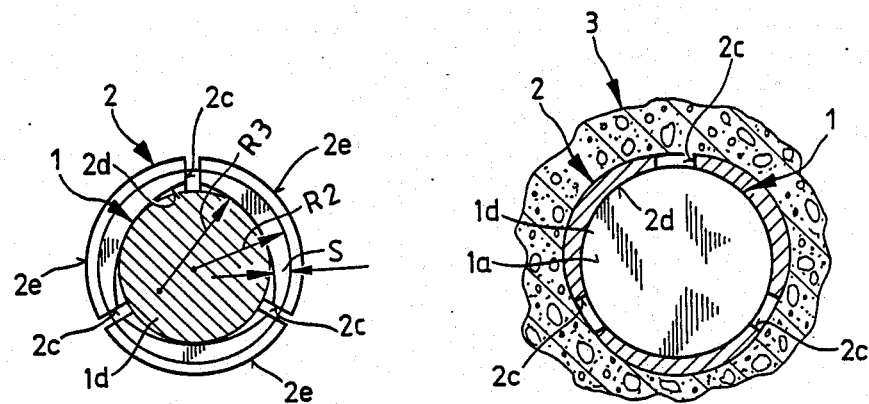
Fig.2
Fig.4
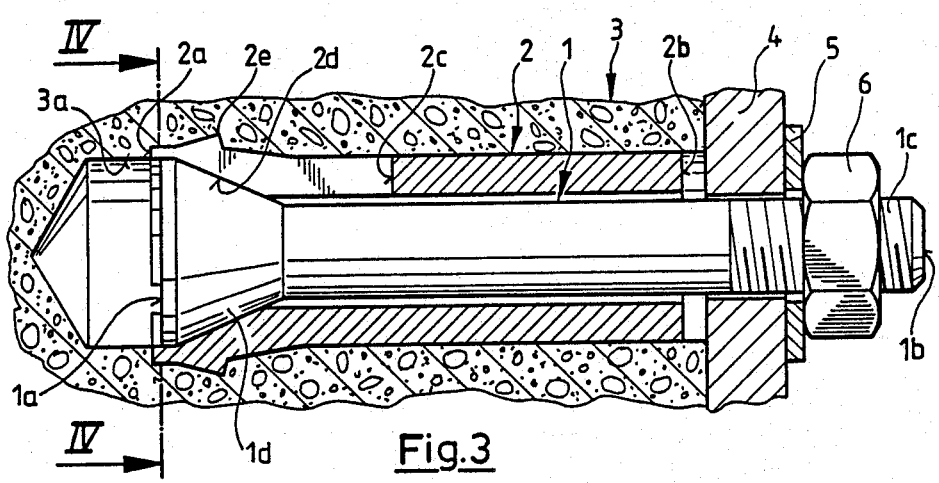
Fig.3

EXPANSION DOWEL ASSEMBLY WITH AN EXPANSION CONE DISPLACEABLE INTO AN EXPANSION SLEEVE

DETAILED DESCRIPTION OF THE INVENTION

The present invention is directed to an expansion dowel assembly with a partially axially slotted expansion sleeve conically widened in its expansion region and an anchor bolt with an expansion cone diverging in the insertion direction of the dowel assembly into a borehole so that the expansion cone can be pulled into the conical inner end of the expansion sleeve.

Quite often, expansion dowel assemblies must be set in crack-prone zones of structures subject to tension, for instance, in ceilings and on the lower sides of beams loaded in bending. Existing cracks can open further to a lesser or greater degree when subjected to different stresses or temperature changes when under stress. Conventional expansion dowel assemblies anchored only by a frictional lock are unsuitable for such applications, since their anchoring value can drop off greatly if a crack extending through the borehole opens up, and may result in the dowel assembly dropping out of the borehole.

Further, it has been known to fasten expansion dowel assemblies in crack-prone tensile zones in a receiving material in a positive locking manner. Initially, an undercut borehole is drilled by use of special tools and subsequently the dowel assembly is anchored in the borehole. Such special tools, so-called undercutting tools, are very often expensive and prone to malfunction. Accordingly, such dowel assemblies are in part expensive, specially manufactured units.

SUMMARY OF THE INvENTION

The primary object of the present invention is to provide a simple and cost-effective expansion dowel assembly for use in crack-prone zones under tensile stress for assuring high extraction values without any need for expensive special tools for forming the borehole.

Accordingly, the present invention is a combination of the following features:
 (a) the cone angle of the expansion cone is greater than the cone angle of the conically shaped inside leading end of the expansion sleeve;
 (b) the wall thickness of the expansion sleeve in its leading expansion region decreases in the circumferential direction towards axially extending slots in the sleeve, and
 (c) the outside surface of the expansion region of the expansion sleeve has at least one circumferentially extending annular bead.

Due to the larger cone angle of the expansion cone, as compared to the cone angle in the leading conically shaped end of the expansion sleeve, initially a very large widening of the expansion sleeve takes place at the outset of the expansion operation. With the continued widening of the expansion sleeve, the cone angle within the sleeve at its leading end gradually matches the cone angle of the expansion cone. At the maximum degree of widening of the expansion sleeve, the two cone angles are equal with the inside surface of the expansion sleeve resting against the surface of the expansion cone.

The wall thickness of the expansion sleeve in its expansion region decreases in the circumferential direction towards axially extending slots in the sleeve, whereby a non-uniform distribution of the expansion pressure around the circumference of the expansion dowel assembly occurs during the expanding operation. The expansion pressure is greatest in the region of the largest wall thickness of the expansion sleeve and decreases toward the axially extending slots. As a result, the expansion sleeve is pressed with the greatest force into the receiving material in the region of the greatest wall thickness. As the expansion sleeve is widened or expanded, the outside surface of the expansion sleeve has a polygon-like shape. The circumferential annular bead located on the outside surface of the expansion sleeve is pressed into the surface of the borehole as the sleeve is widened and develops a positive locking engagement of the expansion sleeve with the receiving material.

At the commencement of the expanding operation, the annular bead is pressed into the surface of the borehole with a very great force, due to the different cone angles of the expansion cone and the leading end of the bore within the expansion sleeve. This effect is enhanced by the variable wall thickness of the expansion section or region of the expansion sleeve which decreases in the circumferential direction toward the axially extending slots. As a result, the expansion sleeve is axially fixed in the borehole and subsequent expansion is assured.

The different cone angles of the expansion cone and the leading end of the bore in the expansion sleeve provide a linear contact of the expansion sleeve with the expansion cone at the leading end of the expansion sleeve at the commencement of the expanding operation. The expansion sleeve is intended, however, to come to rest against the expansion cone during the course of the expanding operation to enable a satisfactory distribution of the expansion pressure. Therefore, the difference between the cone angle of the expansion cone and of the leading end region of the bore in the expansion sleeve is appropriately in the range of 5° to 20°, preferably approximately 10°. An angular difference of such magnitude assures that the front end of the expansion sleeve contacts the expansion cone at the outset of the expanding operation and that the expansion pressure is correspondingly high at such time, so that a stress peak in the receiving material containing the borehole in which the expansion dowel assembly is inserted results with the leading end expansion region being impressed into the surface of the borehole The reduction in the wall thickness of the expansion sleeve in the circumferential direction toward the axially extending slots can be attained in different ways. For a simple formation of the expansion sleeve, it is advantageous if the variable wall thickness of the sleeve is formed by an eccentric arrangement of the inside radii as compared to the outside radius. Preferably, the inside radii are larger than the outside radius of the expansion sleeve. The inside surface contour of the expansion sleeve can be produced by a cylindrical member having its axis inclined with respect to the longitudinal axis of the expansion sleeve or by using a conical member with its axis extending parallel to the axis of the expansion sleeve. Accordingly, the inside radius in the expansion region of the expansion sleeve is constant or increases toward the leading end of the sleeve, that is, the end leading in the direction in which the dowel assembly is inserted into a borehole. To assure that the expansion sleeve at least partially rests around the entire circumference of the expansion cone, when maximum expansion of the expansion sleeve has been reached, it is appropriate that the largest inside radius of the expansion sleeve corresponds approximately to the largest radius of the expansion cone. If the expansion cone is drawn completely into the expansion sleeve at its largest radius, the expansion sleeve will rest around its entire inside periphery against the expansion cone.

The annular bead located in the expansion region on the outside surface of the expansion sleeve cannot be allowed to interfere with the insertion of the expansion dowel assembly into a borehole. Conversely, at least a portion of the anchoring value is to be provided by the annular bead engaging into the receiving material in a positive locking manner. To provide this effect, preferably the annular bead has a sawtooth-like cross-section with the shorter flank facing toward the trailing end of the expansion sleeve. The shorter flank facing toward the trailing end of the expansion sleeve can extend relatively steeply and, in an extreme case, approximately at right angles to the axis of the sleeve. The longer flank facing toward the leading end of the expansion sleeve extends at a generally shallow angle relative to the axis of the sleeve and provides a good centering action as the dowel assembly is inserted into a borehole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending view, partly in section, illustrating an expansion dowel assembly embodying the present invention with the assembly displayed in the unexpanded state;

FIG. 2 is a cross sectional view taken along the line II—II in FIG. 1;

FIG. 3 is an axially extending view, partly in section, showing the expansion dowel of FIGS. 1 and 2 in the expanded anchored state within a receiving material; and FIG. 4 is a cross sectional view taken along the line IV—IV of the expansion dowel assembly in FIG. 3.

DETAILED DESCRIPTION OF THE INVENTION

In FIGS. 1–4, an expansion dowel assembly is illustrated made up of an axially extending anchor bolt 1 and an axially extending expansion sleeve 2, laterally enclosing an axially extending part of the anchor bolt. As viewed in FIG. 1 and as shown in FIG. 3, the left-hand end of the anchor bolt and of the sleeve is the leading end and the right-hand end is the trailing end when the dowel assembly is inserted into a borehole 3a in a receiving material 3. Anchor bolt 1 has a leading end 1a and a trailing end 1b. An axially extending part of the anchor bolt, adjacent its trailing end 1b, has a thread 1c. At its leading end 1a, the anchor bolt has an expansion cone 1d and the cone widens from a shank part of the bolt to the leading end 1a. Expansion sleeve 2 has a leading end 2a and a trailing end 2b. Axially extending slots 2c extend from the leading end 2a, toward but spaced from the trailing end 2b. The axially extending slots 2c facilitate the radial expansion of the expanding region of the dowel assembly, note FIG. 3. Expansion sleeve 2 has an axially extending bore from its leading end to its trailing end and a conically-shaped bore section 2d extending from the leading end 2a for approximately half of the length of the slotted section of the sleeve. Expansion cone 1d has a larger cone angle $\alpha$, than the cone angle $\beta$, of the bore section 2d. As a result, in its unexpanded state, as shown in FIG. 1, only the leading end edge of the sleeve contacts the expansion cone 1d. Accordingly, there is only linear contact in the circumferential direction between the expansion cone and the sleeve. Adjacent its leading end in the range of the conically shaped bore section 2d, the outside surface of the expansion sleeve has a circumferentially extending annular bead 2e. Annular bead 2e has a sawtooth-like cross section and serves to provide a positive locking connection of the expansion sleeve 2 with the receiving material 3, note FIG. 3.

As shown best in FIG. 2, the wall thickness S of the expansion region of the expanding sleeve 2, decreases in the circumferential direction toward the axially extending slots 2c. The varying wall thickness S can be provided by arranging the inside radii R3, eccentrically with respect to the radius R2 of the expansion sleeve. The largest inside radius R3 corresponds approximately to the largest radius R1 of the expansion cone 1d. As a result, the leading end 2a of the expansion sleeve 2, contacts the entire circumferential periphery of the expansion cone 1d, when the cone is completely drawn into the expansion sleeve 2, note FIG. 3. Therefore, a uniform distribution of the expansion pressure around the entire periphery is obtained. At the start of the expanding operation, a very pronounced widening of the expansion sleeve takes place, due to the different cone angles $\alpha$, $\beta$, of the expansion cone 1d and the bore section 2d, whereby the expansion sleeve is pressed outwardly into the surface of the borehole 3a in the region of its largest wall thickness. Accordingly, pressure peaks develop at the annular bead 2e and cause the positive locking engagement of the annular bead 2e into the surface of the borehole 3a in the receiving material 3. In FIG. 3, a part 4 to be secured to the receiving material is placed on the anchor bolt 1 and is fastened by a washer 5 and a hexagonal nut 6 to the receiving material. Due to the positive locking engagement of the expansion sleeve 2, by means of the annular bead 2e into the receiving material 3, the expansion dowel assembly, in the present invention, is particularly suited for use in crack-prone zones in a receiving material which are subject to tensile stressing.

FIG. 4 shows the contact of the expansion sleeve 2 at the circumference of the anchor bolt 1 in the expanded state. The expansion dowel assembly affords good security against rotation because of the polygon-like outer shape developed while the expansion sleeve 2 is widened.

While specific embodiments of the invention have been shown and described in detail to illustrate the application of the inventive principles, it will be understood that the invention may be embodied otherwise without departing from such principles.

I claim:

1. An expansion dowel assembly for insertion into a borehole in a receiving material and having a leading end and a trailing end relative to the insertion direction of the dowel assembly into the borehole, the dowel assembly including an axially extending expansion sleeve with a leading end and a trailing end and a bore extending axially therethrough, said sleeve having a cylindrically shaped outer surface, said expansion sleeve having an axially extending expansion region adjacent the leading end thereof with the bore in said expansion region widening toward the leading end, said expansion sleeve having circumferentially spaced axially extending slots extending from the leading end toward the trailing end thereof and extending at least for the axial extent of the expansion region, and an axially extending anchor bolt having a leading end and a trailing end and extending through said bore in said expansion sleeve with the leading end of said anchor bolt having an expansion cone widening in the insertion direction and arranged to be drawn into the leading end of said expansion sleeve toward the trailing end thereof for expanding said expansion sleeve, wherein the improvement comprises that:

(a) said expansion cone has a cone angle and said expansion region has a cone angle and the cone angle of said expansion cone is larger than the cone angle of said expansion region;

(b) said expansion sleeve in said expansion region has a variable wall thickness in the circumferential direction with the wall thickness diminishing in the direction toward said slots, the radius of said outer surface of said expansion sleeve being centered on the axis thereof, said expansion sleeve having an inner surface eccentrically arranged relative to the axis thereof; and (c) the outer surface of said expansion region has a circumferentially extending annular bear projecting outwardly from the outer surface of said expansion sleeve.

2. An expansion dowel assembly, as set forth in claim 1, wherein the difference between the cone angle of said expansion cone and the cone angle of the bore in said expansion region is in the range of 5° to 20°.

3. An expansion dowel assembly, a st forth in claim 2, wherein the difference between the cone angle of said expansion cone and the cone angle of the bore in said expansion region is approximately 10°.

4. An expansion dowel assembly, as set forth in claim 1, wherein said expansion cone has a maximum radius, and the inside radius of said expansion region corresponds approximately to the maximum radius of said expansion cone.

5. An expansion dowel assembly, as set forth in claim 1, wherein said annular bead has a sawtooth-like profile in axially extending cross section with a shorter flank facing toward the trailing end of said expansion sleeve.

* * * * *